(12) United States Patent
Chen et al.

(10) Patent No.: US 8,976,517 B2
(45) Date of Patent: Mar. 10, 2015

(54) ELECTRONIC DEVICE WITH IMPACT-RESISTANT DISPLAY MODULE

(75) Inventors: Wan-Tien Chen, Hsinchu (TW);
Ming-Sheng Chiang, Hsinchu (TW);
Wen-Chang Lu, Hsinchu (TW);
Hung-Yi Tsai, Hsinchu (TW);
Yuan-Chih Tsai, Hsinchu (TW);
Chu-Kuang Tseng, Hsinchu (TW);
Chi-Ming Wu, Hsinchu (TW);
Jen-Shiun Huang, Hsinchu (TW);
Tsung-Ting Lee, Hsinchu (TW);
Chen-Fa Tsai, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 302 days.

(21) Appl. No.: 13/536,496

(22) Filed: Jun. 28, 2012

(65) Prior Publication Data

US 2013/0027853 A1    Jan. 31, 2013

(30) Foreign Application Priority Data

Jul. 28, 2011   (TW) .............................. 100126852 A (51) Int. Cl.
*G06F 1/16*   (2006.01)
*H05K 5/00*   (2006.01)
*H05K 7/00*   (2006.01)
*G02F 1/1333* (2006.01)

(52) U.S. Cl.
CPC ........ *G02F 1/133308* (2013.01); *H05K 5/0017* (2013.01); *G02F 2201/503* (2013.01)
USPC ............ 361/679.21; 361/679.01; 361/679.02; 349/60

(58) Field of Classification Search
USPC .............. 361/679.01, 679.02, 679.21; 349/60
See application file for complete search history.

(56) References Cited

U.S. PATENT DOCUMENTS

| | | | | |
|---|---|---|---|---|
| 5,703,665 | A  * | 12/1997 | Muramatsu et al. | 349/60 |
| 6,838,812 | B2 * | 1/2005  | Uchida | 313/483 |
| 2006/0066772 | A1 * | 3/2006 | Takahashi et al. | 349/60 |
| 2009/0207560 | A1 * | 8/2009 | Lee | 361/679.01 |

FOREIGN PATENT DOCUMENTS

| | | |
|---|---|---|
| CN | 201029017 Y | 2/2008 |
| CN | 101515210 A | 8/2009 |
| TW | 201107840 A | 3/2011 |
| TW | 201112087 A | 4/2011 |
| TW | M404576     | 5/2011 |

OTHER PUBLICATIONS

Taiwan Intellectual Property Office, "Office Action", Apr. 21, 2014.
China Patent Office, Office Action, Oct. 10, 2014, China.

* cited by examiner

*Primary Examiner* — Hoa C Nguyen
*Assistant Examiner* — Binh Tran
(74) *Attorney, Agent, or Firm* — WPAT, PC; Justin King (57) ABSTRACT

An electronic device includes a shell, a display module and a cushion. The shell includes a bottom plate and a top plate. The top plate defines an opening. The display module is disposed in the shell and faces the opening. The display module is spaced from the bottom plate of the shell. The cushion is disposed between the display module and the bottom plate of the shell, and brought into contact with the display module for cushioning the display module when an external force is applied to the display module.

13 Claims, 11 Drawing Sheets

ELECTRONIC DEVICE WITH IMPACT-RESISTANT DISPLAY MODULE

TECHNICAL FIELD

The present invention relates to electronic devices, and more particularly to an electronic device having an impact-resistant display module.

BACKGROUND

Nowadays, display modules are widely applied to electronic devices. The display modules are key parts of the electronic devices. Compared to other parts of the electronic devices, the display modules have more precise configuration and cost more.

Figure 1:
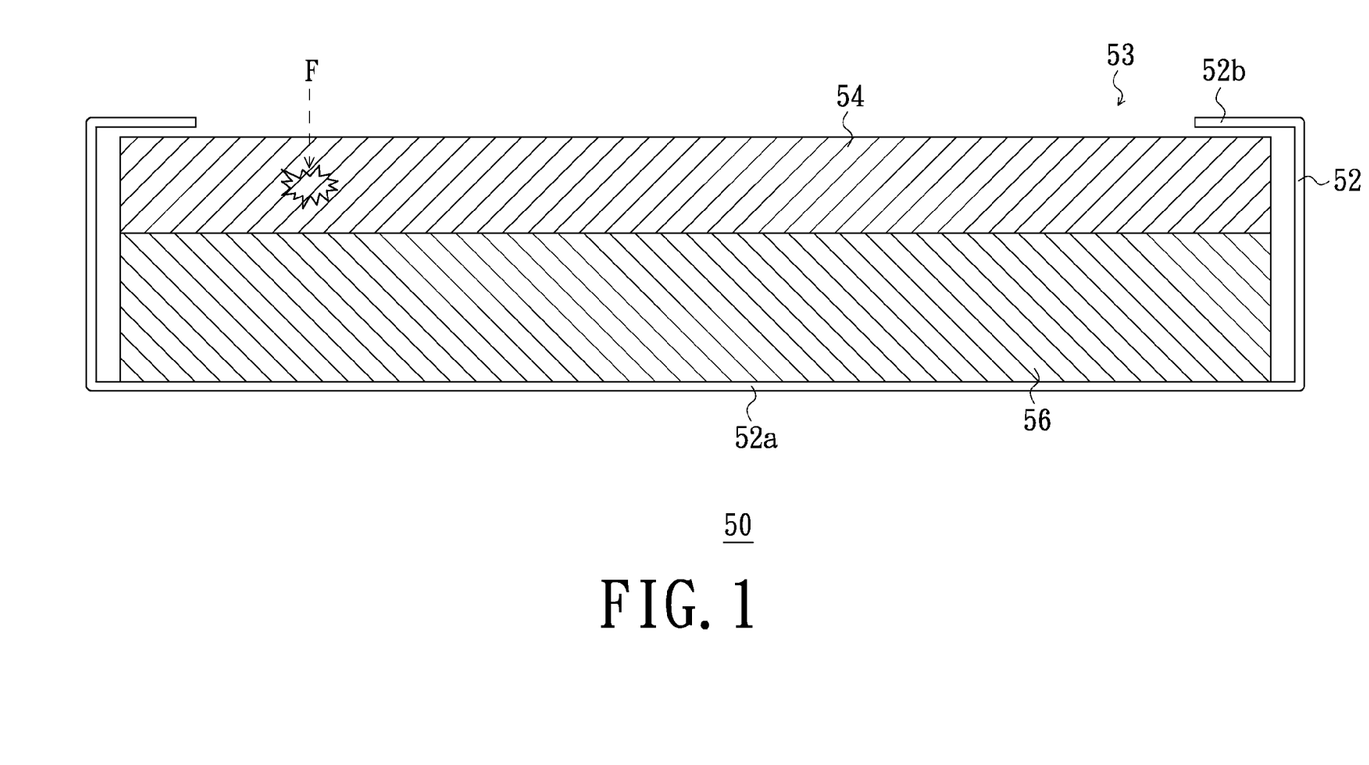
FIG. 1 is a schematic, cross-sectional view of a conventional electronic device.

FIG. 1 shows a conventional electronic device 50. The electronic device 50 includes a shell 52, a display module 54 and an operation module 56. The display module 54 and the operation module 56 are disposed in the shell 52. The operation module 56 is disposed on a bottom plate 52a of the shell 52, and the display module 54 is set on the operation module 56. The shell 52 defines an opening 53 in a top plate 52b thereof to expose the display module 54.

Since no protection measures are provided to protect the display module 54, an external force F may directly applied to the display module 54. The external force F is transmitted to the operation module via the display module 54 and then to the bottom plate 52a of the shell 52 via the operation module 56. The display module 54 and the operation module 56 are easily damaged by the external force F. Thus, an impact by an external force should be considered in design of a display module.

SUMMARY

Therefore, the present invention provides an electronic device including a shell, a display module and a cushion. The shell includes a bottom plate and a top plate. The top plate defines an opening. The display module is disposed in the shell and faces the opening. The display module is spaced from the bottom plate of the shell. The cushion is disposed between the display module and the bottom plate, and is in contact with the display module.

The present invention further provides an electronic device including a shell, a display module, a transparent plate, and a cushion. The shell includes a bottom plate, a top plate and a sidewall interconnecting the bottom plate with the top plate. The top plate has a center portion thereof being defined with an opening. The display module is disposed in the shell and spaced from the bottom plate. The transparent plate covers the opening and is disposed between the display module and the top plate. The display module is in contact with the transparent plate. The cushion is disposed between the display module and the bottom plate. The cushion is in contact with the display module.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
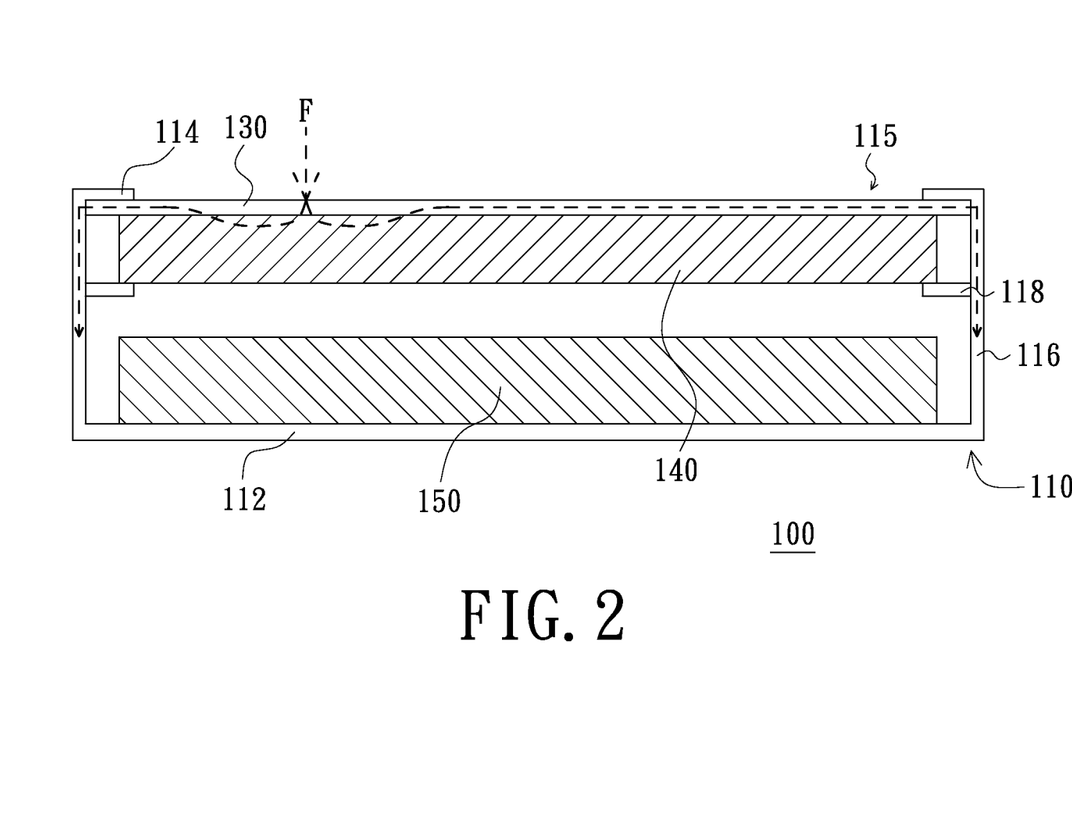
FIG. 2 is a schematic, cross-sectional view of an electronic device according to a first embodiment of the present invention.

FIG. 2 shows an electronic device 100 according to a first embodiment of the present invention. The electronic device 100 may be, without limitation, a mobile phone, a personal digital assistant (PDA) or an E-book. The electronic device 100 includes a shell 110, a transparent plate 130, a display module 140 and an operation module 150. The shell 110 includes a bottom plate 112, a top plate 114 and a sidewall interconnecting the bottom plate 112 with the top plate 114. The top plate 114 has a center portion thereof being cut off to define an opening 115. The operation module 150 is received in the shell 110 and disposed on the bottom plate 112. The display module 140 is received in the shell 110 and disposed above the operation module 150. The display module 140 is spaced from the operation module 150 such that there is a gap between the display module 140 and the operation module 150. The display module 140 is electrically connected to the operation module 150.

In this embodiment, a gap is formed between the display module 140 and the operation module 150. There is no hard material filled in the gap, and the gap is filled with air. A supporting portion 118 extends radially inwardly from an inner surface of the sidewall 116 to support the display module 140 thereon. The transparent plate 130 is sandwiched between the display module 140 and the top plate 114 to cover the opening 115. A peripheral edge of the transparent plate 130 is fixed to the top plate 114. The display module 140 has a top surface thereof brought into contact with the transparent plate 130.

The transparent plate 130 may be made of glass, polymethylmethacrylate (PMMA), polycarbonate (PC) or other transparent materials. It should be understood that, the transparent plate 130 may be omitted in other embodiments. The display module 140 may be a flexible display or inflexible display. The flexible display may include an E-paper display such as an electrophoretic display, or an electrowetting display. The display module 140 may also be a touch display, such as optical touch display, or capacitive touch display. The operation module 150 includes other necessary elements except for the display module 140 to make the electronic device 100 work. For example, the operation module 150 may include a circuit board, a processor and a power source, and the elements of the operation module 150 can be altered according to the type of the electronic device 100.

In this embodiment, since the transparent plate 130 is located on the display module 140 to cover the opening 115, the external force F cannot be directly applied to the display module 140. In addition, since the transparent plate 130 is fixed to the top plate 114, the external force F applied on the transparent plate 130 is partially transmitted to the sidewall 116 and then to the bottom plate 112 of the shell 110, as schematically shown by dashed arrows in FIG. 2. There is no hard material filled in the gap between the display module 140 and the operation module 150. The gap is filled with air, which acts as a cushion for cushioning the display module 140 and accordingly reducing deformation of the display module 140. This cushion effect can reduce the impact of the external force F on the display module 140 even if the external force F is partially transmitted to the display module 140. In other words, the air in the gap can function as a cushion to buffer the deformation of the display module 140. Therefore, the electronic device 100 can reduce the impact of the external force F on the display module 140 and the operation module 150. The display module 140 and the operation module 150 are therefore prevented from damage.

Figure 3:
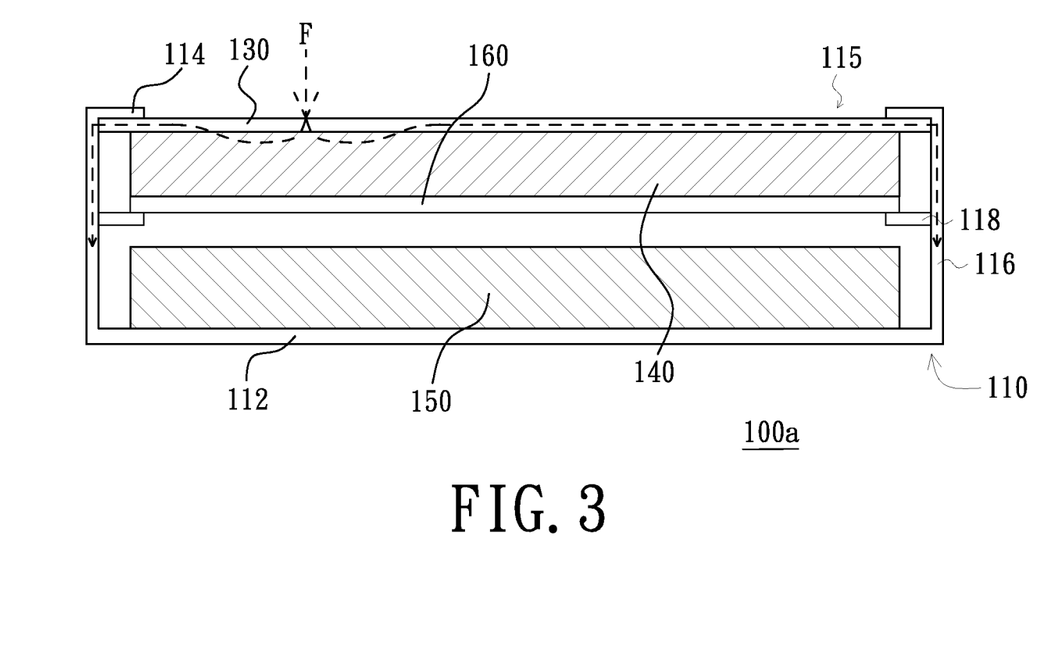
FIG. 3 is a schematic, cross-sectional view of an electronic device according to a second embodiment of the present invention.

FIG. 3 shows an electronic device 100a according to a second embodiment of the present invention. The structure of the electronic device 100a is similar to the electronic device 100, except that the electronic device 100a further includes a cushion 160. The cushion 160 is disposed at a bottom surface of the display module 140. The cushion 160 is an elastic element made of elastic transparent or non-transparent material. The cushion 160 is disposed on the supporting portion 118 and separates the display module 140 from the supporting portion 118. In addition, there is also a gap between a bottom surface of the cushion 160 and the operation module 150. There is no hard material filled in the gap. The gap may be filled with air. Due to the cushion 160, even if the external force F is large enough to bring the deformed display module 140 into contact with the operation module 150, the impact of the external force F on the display module 140 and the operating module 150 can be reduced by the cushion 160.

Figure 4:
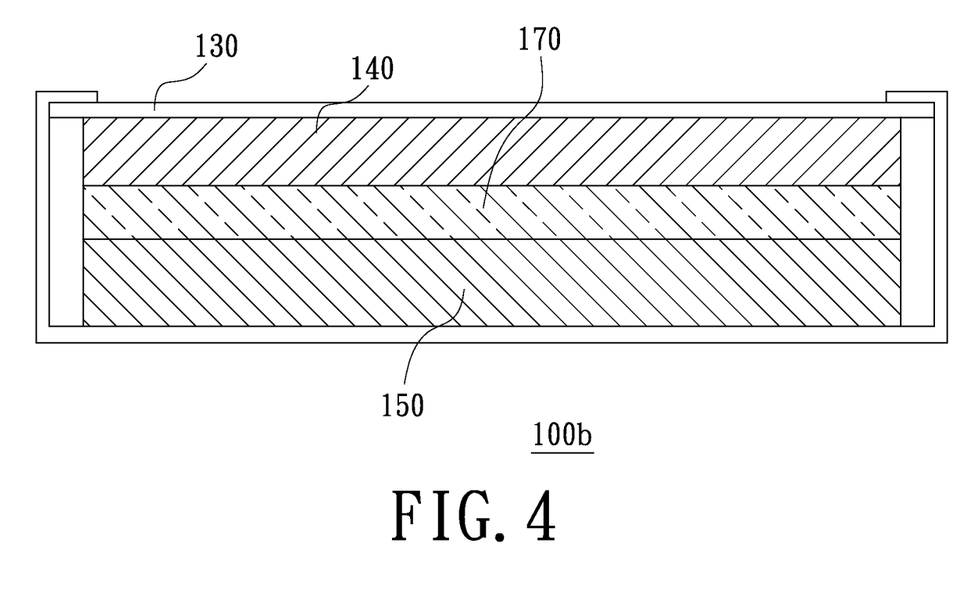
FIG. 4 is a schematic, cross-sectional view of an electronic device according to a third embodiment of the present invention.

FIG. 4 shows an electronic device 100b according to a third embodiment of the present invention. The structure of the electronic device 100b is similar to the electronic device 100, except that the electronic device 100b further includes a cushion 170. The cushion 170 is disposed between and brought into contact with the operation module 150 and the display module 140. The cushion 170 may be an elastic element set between the operation module 150 and the display module 140. Also, the cushion 170 may be formed by filling an elastic material into the gap between the operation module 150 and the display module 140. Since the cushion 170 supports the display module 140, the supporting portion of the shell 110 may be omitted. The elastic cushion 170 can absorb the external force and therefore reduce the impact of the external force on the display module 140 and the operation module 150, thereby preventing the display module 140 and the operation module 150 from damage.

Figure 5:
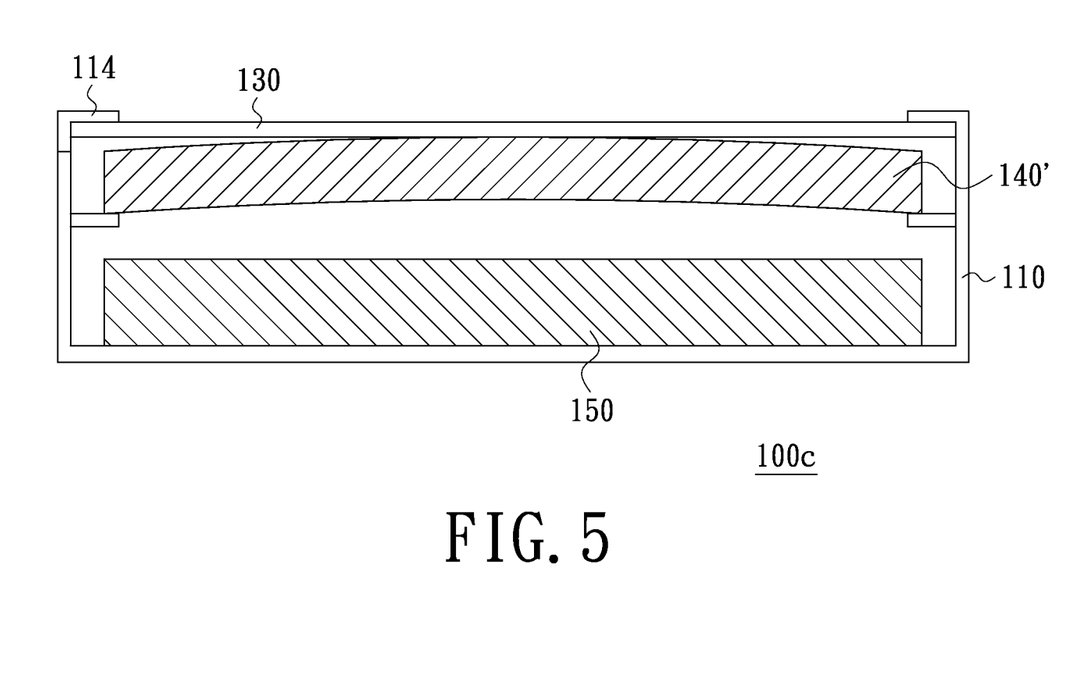
FIG. 5 is a schematic, cross-sectional view of an electronic device according to a fourth embodiment of the present invention.

FIG. 5 shows an electronic device 100c according to a fourth embodiment of the present invention. The structure of the electronic device 100c is similar to the electronic device 100, except that the display module 140' of the electronic device 100c is flexible and has a curved shape. A middle portion of the display module 140' protrudes outwardly towards and abuts against the transparent plate 130. In the present embodiment, the transparent plate 130 does not need to be fixed to the top plate 114 of the shell 110, and can be supported against the top plate 114 by the protruded display module 140'.

In this embodiment, since the display module 140' is curved and flexible, the transparent plate 130 on the display module 140' disperses the external force applied thereon, and the external force is transmitted to the protruded middle portion of the display module 140' to cause the middle portion of the display module 140' to deform inwardly towards the operation module 150. The deformation of the flexible display module 140' can absorb the external force and therefore reduce the impact of the external force transmitted to the display module 140'. It should be understood that, a cushion may be set between the display module 140' and the operation module 150 to further reduce the impact of the external force on the display module 140' and the operation module 150. The cushion may be an elastic element/material set between the display module 140' and the operation module 150 or the air filled in the gap between the display module 140' and the operation module 150.

Figure 6:
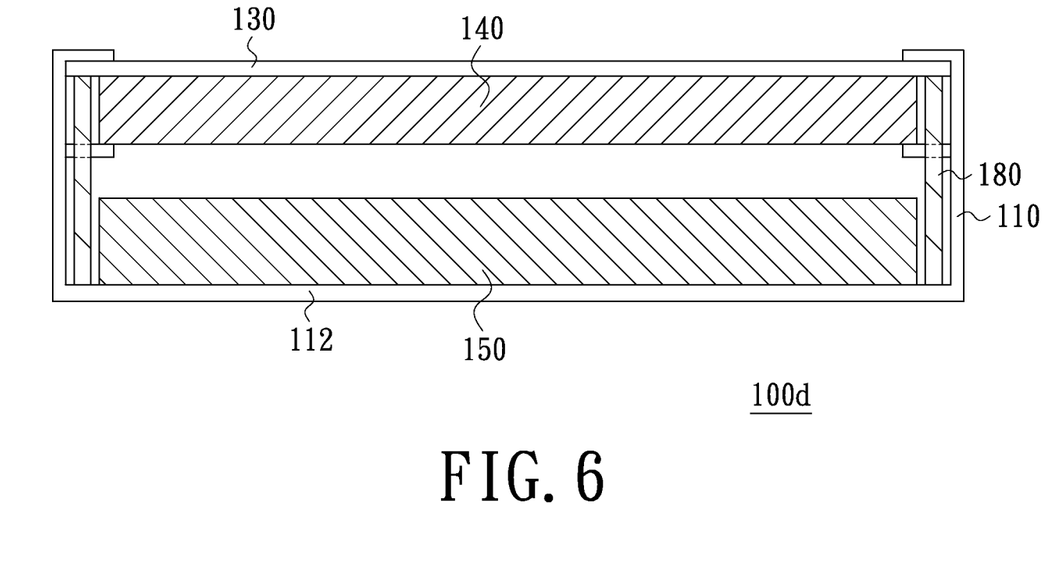
FIG. 6 is a schematic, cross-sectional view of an electronic device according to a fifth embodiment of the present invention.

FIG. 6 shows an electronic device 100d according to a fifth embodiment of the present invention. The structure of the electronic device 100d is similar to the electronic device 100, except that the electronic device 100d further includes a supporting part 180 for supporting the transparent plate 130. The supporting part 180 may include a plurality of supporting posts disposed on the bottom plate 112 of the shell 110. In other words, the transparent plate 130 does not need to be fixed to the top plate 114 of the shell 110 and is supported by the supporting part 180.

In this embodiment, when the external force is applied to the transparent plate 130, the transparent plate 130 disperses the external force, and the dispersed force is transmitted to the bottom plate 112 of the shell 110 via the supporting part 180. Thus, the impact of the external force on the display module 140 may be avoided. It should be understood that, a cushion may be set between the display module 140 and the operation module 150 to further prevent the display module 140 and the operation module 150 from damage. The cushion may be an elastic element/material set between the display module 140 and the operation module 150 or the air filled in a gap between the display module 140 and the operation module 150.

Figure 7:
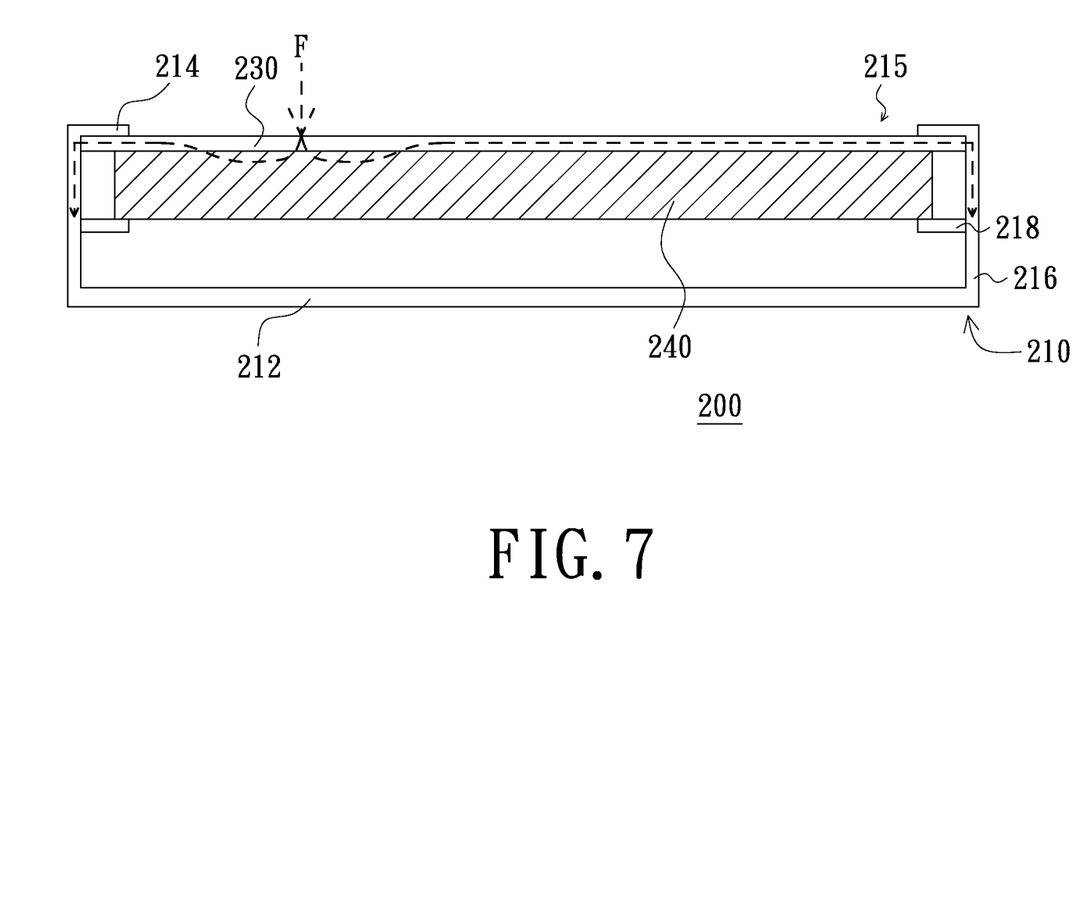
FIG. 7 is a schematic, cross-sectional view of an electronic device according to a sixth embodiment of the present invention.

FIG. 7 shows an electronic device 200 according to a sixth embodiment of the present invention. The electronic device 200 includes a shell 210, a transparent plate 230 and a display module 240. The shell 210 includes a bottom plate 212, a top plate 214 and a sidewall 216 interconnecting the bottom plate 212 with the top plate 214. The top plate 214 defines an opening 215. The display module 240 is disposed in the shell 210 and spaced from the bottom plate 212. A gap is formed between the display module 240 and the bottom plate 212. There is no hard material filled in the gap, and the gap is filled with air. In the embodiment, the operation module is not provided in the shell 210 and therefore not shown. Nevertheless, the operation module can be put outside the shell 210 and the display module 240 is electrically connected to the operation module.

In this embodiment, the shell 210 includes a supporting portion 218 extending from an inner surface of the sidewall 216 to support the display module 240 thereon. The transparent plate 230, disposed between the display module 240 and the top plate 214 of the shell 210, is fixed to the top plate 214. The transparent plate 230 covers the opening 215, and the display module 240 is contacted with the transparent plate 230.

The transparent plate 230 and the display module 240 are respectively similar to the transparent plate 130 and the display module 140. Thus, the details about the transparent plate 230 and the display module 240 are not described here. In this embodiment, since the transparent plate 230 covers the opening 215, the external force F cannot be directly applied to the display module 240. In addition, since the transparent plate 230 is fixed to the top plate 214, the external force F is partially transmitted to the sidewall 216 of the shell 210 via the transparent plate 230 and then to the bottom plate 212 via the sidewall 216. There is no hard material filled in the gap between the display module 240 and the bottom plate 212. The air in the gap acts as a cushion and gives a room for cushioning the display module 240 and reducing deformation of the display module 240. This cushion effect can reduce the impact of the external force F on the display module 240 even if the external force F is partially transmitted to the display module 240. In other words, the air in the gap can function as a cushion to buffer the deformation of the display module 240. Therefore, the electronic device 200 can reduce the impact of the external force F on the display module 240. This prevents the display module 240 from damage.

Figure 8:
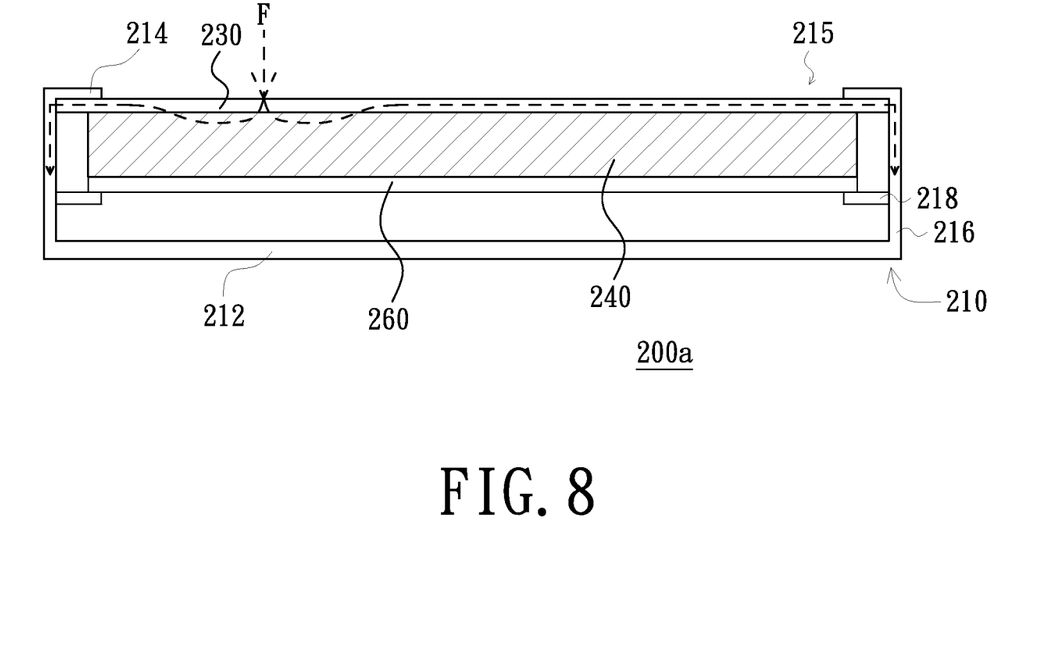
FIG. 8 is a schematic, cross-sectional view of an electronic device according to a seventh embodiment of the present invention.

FIG. 8 shows an electronic device 200a according to a seventh embodiment of the present invention. The structure of the electronic device 200a is similar to the electronic device 200, except that the electronic device 200a further includes a cushion 260. The cushion 260 is disposed under the display module 240. The cushion 260 may be made of elastic transparent or non-transparent material. The cushion 260 is disposed on the supporting portion 218, and separates the display module 240 from the supporting portion 218. In addition, there is also a gap between the cushion 260 and the bottom plate 212. There is no hard material filled in the gap between the cushion 260 and the bottom plate 212. The gap may be filled with air. Due to the cushion 260, even if the external force F is large enough to bring the deformed display module 140 to touch the bottom plate 212, the impact of the external force F on the display module 140 can be reduced by the cushion 260. In this embodiment, the operation module is not provided in the shell 210 and therefore not shown. Nevertheless, the operation module can be put outside the shell 210 and the display module 240 is electrically connected to the operation module.

Figure 9:
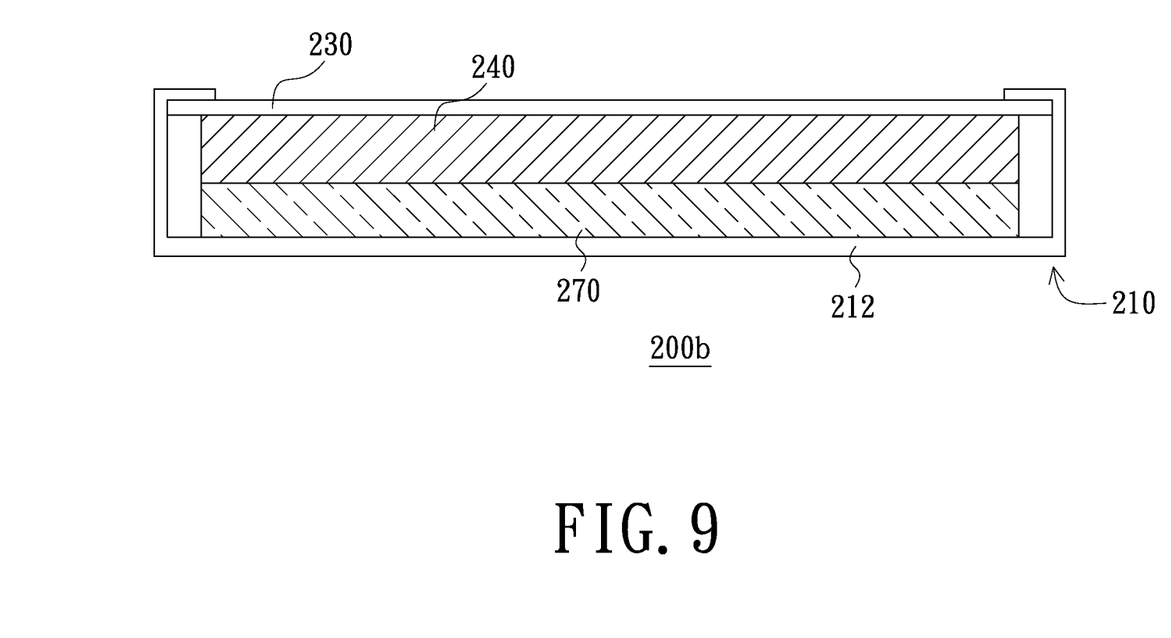
FIG. 9 is a schematic, cross-sectional view of an electronic device according to an eighth embodiment of the present invention.

FIG. 9 shows an electronic device 200b according to an eighth embodiment of the present invention. The structure of the electronic device 200b is similar to the electronic device 200, except that the electronic device 200b further includes a cushion 270. The cushion 270 is disposed between and brought into contact with the bottom plate 212 and the display module 240. Since the cushion 270 supports the display module 240, the supporting portion of the shell 210 may be omitted. The cushion 270 may be made of elastic material. The elastic cushion 270 can reduce the impact of the external force on the display module 240, thereby preventing the display module 240 from damage.

Figure 10:
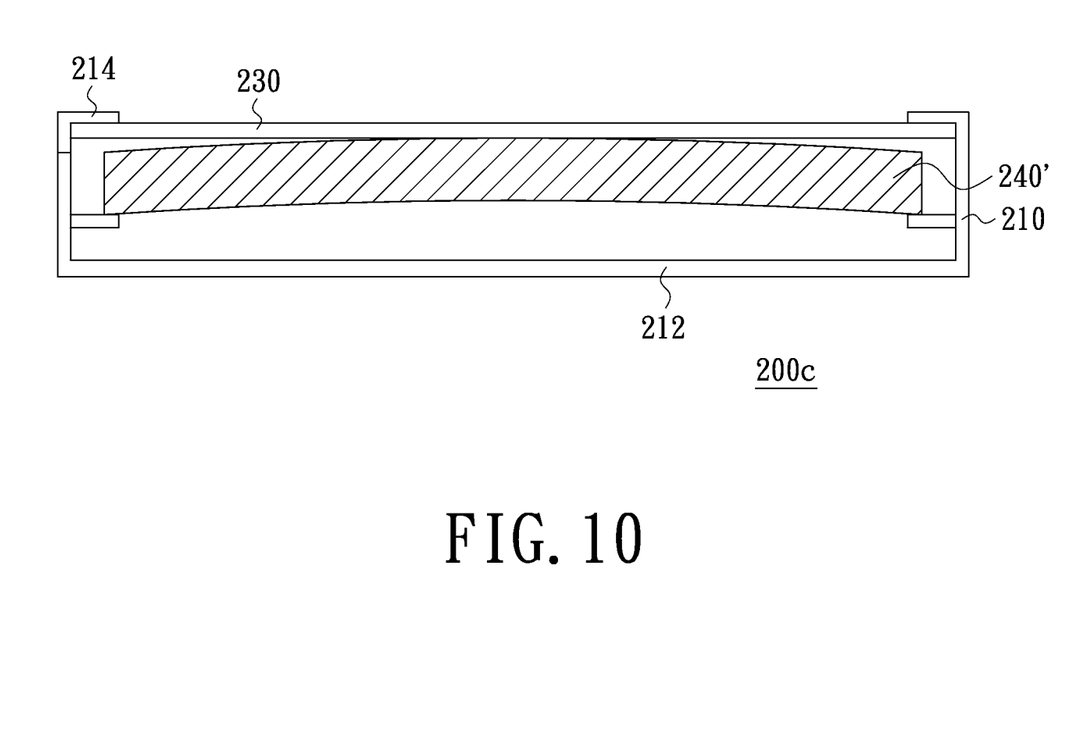
FIG. 10 is a schematic, cross-sectional view of an electronic device according to a ninth embodiment of the present invention.

FIG. 10 shows an electronic device 200c according to a ninth embodiment of the present invention. The structure of the electronic device 200c is similar to the electronic device 200, except that the display module 240' of the electronic device 200c is flexible and has a curved shape. A middle portion of the display module 240' protrudes outwardly to support the transparent plate 230. In the present embodiment, the transparent plate 230 does not need to be fixed to the top plate 214 of the shell 210, and is supported by the protruded middle plate of the display module 240' against the top plate 214.

In this embodiment, since the display module 240' is curved and flexible, the transparent plate 230 on the display module 240' disperses the external force applied thereon, and the dispersed force is transmitted to the protruded middle portion of the display module 240' to cause the middle portion of the display module 240' to deform inwardly towards the bottom plate 212. The deformation of the flexible display module 240' can absorb the external force and therefore reduce the impact of the external force on the display module 240'. It should be understood that, a cushion may be set between the display module 240' and the bottom plate 212 to further reduce the impact of the external force on the display module 240'. The cushion may be an elastic element/material set between the display module 240' and the bottom plate 212 or the air filled in a gap between the display module 140' and the bottom plate 212.

Figure 11:
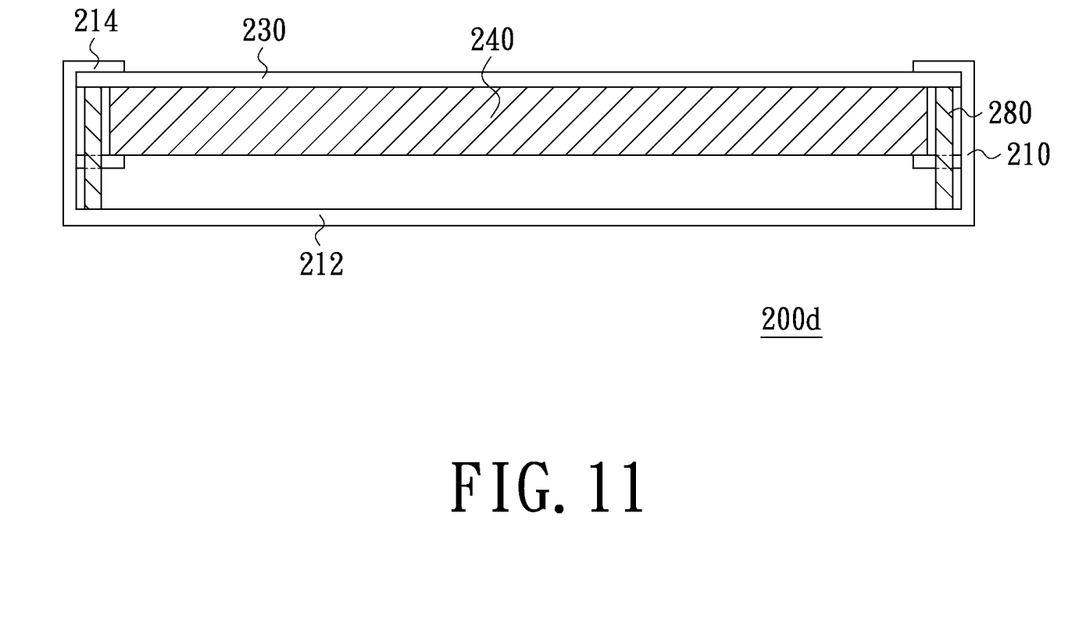
FIG. 11 is a schematic, cross-sectional view of an electronic device according to a tenth embodiment of the present invention.

FIG. 11 shows an electronic device 200d according to a tenth embodiment of the present invention. The structure of the electronic device 200d is similar to the electronic device 200, except that the electronic device 200d further includes a supporting part 280 to support the transparent plate 230. The supporting part 280 may include a plurality of supporting posts disposed on the bottom plate 212 of the shell 210. That is to say, the transparent plate 230 does not need to be fixed to the top plate 214 of the shell 210, and is supported by the supporting part 280.

In this embodiment, when the external force is applied to the transparent plate 230, the transparent plate 230 disperses the external force. The dispersed force is transmitted to the bottom plate 212 of the shell 210 via the supporting part 280. Thus, the impact of the external force on the display module 240 may be avoided. It should be understood that, a cushion may be set between the display module 240 and the bottom plate 212 to further reduce the impact of the external force on the display module 240. The cushion may be an elastic element/material set between the display module 240 and the bottom plate 212 or the air filled in a gap between the display module 240 and the bottom plate 212.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic device, comprising:
   a shell comprising a bottom plate and a top plate, the top plate defining an opening;
   a display module disposed in the shell and facing the opening, the display module spaced from the bottom plate;
   a cushion disposed between the display module and the bottom plate, the cushion being in contact with the display module;

a transparent plate disposed between the display module and the top plate of the shell, wherein the transparent plate covers the opening, the display module is in contact with the transparent plate, and the transparent plate is not fixed by the top plate of the shell; and a supporting part disposed on the bottom plate of the shell to support the transparent plate, wherein the supporting part is directly connected with the transparent plate.

2. The electronic device according to claim 1, wherein a gap is formed between the display module and the bottom plate and filled with air, the air in the gap acts as the cushion.

3. The electronic device according to claim 1, wherein the cushion is formed by an elastic element set between the display module and the bottom plate.

4. The electronic device according to claim 1, wherein the cushion is formed by an elastic material filled between the display module and the bottom plate.

5. The electronic device according to claim 1, wherein the shell comprises a supporting portion extending from an inner wall of the shell to support the display module.

6. The electronic device according to claim 1, further comprising an operation module, wherein the operation module is disposed in the shell and located between the bottom plate and the display module, the display module is spaced from the operation module, and the cushion is positioned between the operation module and the display module.

7. An electronic device, comprising:

a shell comprising a bottom plate, a top plate and a sidewall interconnecting the bottom plate with the top plate, the top plate having a center portion thereof being defined with an opening;

a display module disposed in the shell and spaced from the bottom plate;

a transparent plate covering the opening and disposed between the display module and the top plate, the display module being in contact with the transparent plate, and the transparent plate being not fixed by the top plate of the shell; and a cushion disposed between the display module and the bottom plate, the cushion being in contact with the display module;

a supporting part disposed on the bottom plate of the shell to support the transparent plate, wherein the supporting part is directly connected with the transparent plate.

8. The electronic device according to claim 7, wherein a gap is formed between the display module and the bottom plate and filled with air, the air in the gap acts as the cushion.

9. The electronic device according to claim 7, wherein the cushion is formed by an elastic element set between the display module and the bottom plate.

10. The electronic device according to claim 9, wherein a gap is formed between the elastic element and the bottom plate and filled with air, the air in the gap acts as another cushion for cushioning the display module.

11. The electronic device according to claim 7, wherein the cushion is formed by an elastic material filled between the display module and the bottom plate.

12. The electronic device according to claim 7, wherein a supporting portion extends from an inner surface of the sidewall to support the display module thereon.

13. The electronic device according to claim 7, further comprising an operation module, wherein the operation module is disposed in the shell and located between the bottom plate and the display module, the display module is spaced from the operation module, and the cushion is positioned between the operation module and the display module.

* * * * *